United States Patent [19]
Baker

[11] Patent Number: 4,582,610
[45] Date of Patent: Apr. 15, 1986

[54] WELL WATER AERATION SYSTEM
[76] Inventor: Martin Baker, Rte. 196, Topsham, Me. 04086
[21] Appl. No.: 771,829
[22] Filed: Sep. 3, 1985
[51] Int. Cl.$^4$ ............................................. C02F 1/74
[52] U.S. Cl. .................................... 210/747; 210/758; 210/170; 210/136; 261/119 R; 239/554; 239/559
[58] Field of Search ............... 210/750, 747, 752, 765, 210/218, 758, 916, 170, 220, 150, 136; 261/119 R, DIG. 71; 166/112; 239/DIG. 13, DIG. 21, 554, 558, 559, 561

[56] References Cited
U.S. PATENT DOCUMENTS

| | | | |
|---|---|---|---|
| 2,339,632 | 1/1944 | Folsom | 239/567 |
| 2,591,134 | 4/1952 | Canaris | 210/916 |
| 2,872,415 | 2/1959 | Schleyer et al. | 210/750 |
| 3,086,715 | 4/1963 | Mineau et al. | 239/554 |
| 4,042,510 | 8/1977 | Sullins | 210/220 |
| 4,371,383 | 2/1983 | Rost | 55/192 |
| 4,400,271 | 8/1983 | Lunceford | 210/170 |
| 4,478,765 | 10/1984 | Tubbs | 210/170 |
| 4,491,549 | 1/1985 | Fischer et al. | 210/221.2 |
| 4,518,041 | 5/1985 | Zublin | 239/DIG. 13 |
| 4,526,692 | 7/1985 | Yohe et al. | 210/747 |

FOREIGN PATENT DOCUMENTS

| | | | |
|---|---|---|---|
| 1928730 | 1/1970 | Fed. Rep. of Germany | 210/63 R |
| 2429320 | 1/1975 | Fed. Rep. of Germany | 210/220 |

Primary Examiner—Richard V. Fisher
Assistant Examiner—Linda Evans
Attorney, Agent, or Firm—Daniel H. Kane, Jr.

[57] ABSTRACT

A well water aeration system removes volatile contaminants from well water pumped through the well pipe of a well into a building. An elongate spray conduit is spliced into the well pipe at a location below the top of the well but above the average static water level in the well. The spray conduit is formed with spray holes for spraying, aerating and recirculating a fractional portion of the well water pumped through the well pipe with the fractional portion of sprayed water falling back down the well. The spray holes are selected in number and diameter to maintain adequate pressure for continued pumping of the well water through the well pipe. A check valve at the upper end of the spray conduit stops the backflow of water from the building into the elongate spray conduit when pumping of well water through the well pipe stops. Water in the spray conduit empties through spray holes at the bottom end of the spray conduit leaving a pocket of air in the conduit when pumping of well water through the well pipe ceases. When the pressure gauge at the water tank in the building calls for more water and pumping resumes, the air pocket is expelled through the respective spray holes at the top of the spray conduit voiding the contaminant-laden air and preventing such air from entering the building through the water supply. An elongate aeration conduit of greater diameter encloses the spray conduit so that well water sprayed through the spray holes deflects from the walls of the aeration conduit for greater aeration.

20 Claims, 4 Drawing Figures

WELL WATER AERATION SYSTEM

TECHNICAL FIELD

This invention relates to a new well water aeration system for aeration removal of volatile contaminants from well water pumped through a well pipe from a well or other water source. The invention is applicable, for example, for removing harmful or odor-producing volatile contaminants such as gasoline, sulfur and radon.

BACKGROUND ART

In regions of the country which rely on groundwater and well water for domestic water supply there is increased awareness and concern over harmful or otherwise objectionable groundwater contaminants. For example, possible water source contamination by thousands of abandoned and unattended underground gasoline and oil tanks is a growing national problem. Another risk is posed by the presence of radioactive gas Radon 222 in water supplies of New England. Particularly high levels have been detected and measured in water supplies derived from granitic rock, such as that found in Maine and New Hampshire. Groundwater supplies in many areas of the country carry objectionable odors from natural sulfur compounds.

While a large community water supply or water company is able to correct some of these problems with large-scale, expensive equipment, the individual well water supply owner in rural areas presently has available no economic solution. A number of systems have been proposed for domestic water treatment including atomization aeration of water in a spinning disk atomizer water treatment apparatus for "complete elimination of objectionable absorbed gases and complete oxidation of oxidizable substances", (Schleyer et al., U.S. Pat. No. 2,872,415); spraying, recycling and respraying water in a reactor tank "to purge the water of radon gas" and "breaking up the water droplets for release of radon gas" (Rost, U.S. Pat. No. 4,371,383); and injecting jets of gas for bubbling through a tank such as described in the Fischer et al., U.S. Pat. No. 4,491,549.

A disadvantage of the prior art systems proposed for aeration purging, oxidizing and eliminating volatile contaminants from domestic water supplies is that relatively large, separate and expensive appliances are required to be installed in the home or other building. There is available no in-line well water aeration processing without such additional equipment apparatus.

OBJECTS OF THE INVENTION

It is therefore an object of the present invention to provide a new well water aeration system which provides in-line aeration processing of well water pumped through a well pipe to a building without the necessity of installing additional appliances or reactors in the building.

Another object of the invention is to provide an in-line spraying, aerating and well water recirculating system for removing volatile contaminants from well water which is located in the well and which may be incorporated during installation of a well without substantial additional cost.

A further object of the invention is to provide in-well spraying aeration and recirculation of well water for purging and venting of harmful or objectionable volatile contaminants before entry of the water supply water into the home or other building.

DISCLOSURE OF THE INVENTION

In order to accomplish these results, the present invention provides a well water aeration system for removing volatile contaminants from well water pumped through the well pipe of a well into a building by splicing an elongate spray conduit into the well pipe at a location below the top of the well but above the average static water level in the well. The spray conduit is formed with spray holes for spraying, aerating and recirculating a fractional portion of the well water pumped through the well pipe with the fractional portion of sprayed water falling back down the well. The spray holes are selected in number and diameter to maintain adequate pressure for continued pumping of the well water through the well pipe.

According to the invention, a check valve is coupled to the upper end of the spray conduit to stop the flowback of water from the building into the elongate spray conduit when pumping of well water through the well pipe stops. A feature and advantage of the elongate spray conduit and check valve configuration is that water in the spray conduit empties through spray holes at the bottom end of the spray conduit leaving a pocket of air in the conduit when pumping of well water through the well pipe ceases. When the pressure gauge at the water tank in the home or other building calls for more water and pumping resumes, the air pocket is expelled through the respective spray holes, for example at the top of the spray conduit, voiding the contaminant-laden air and preventing such air from entering the building through the water supply.

In a preferred example embodiment, the invention provides a further elongate aeration conduit of greater diameter than the elongate spray conduit coaxially enclosing the spray conduit so that well water sprayed through the spray holes deflects from the walls of the aeration conduit for greater aeration. The elongate spray conduit and aeration conduit define an aeration chamber with first and second caps at the respective top and bottom ends of the aeration conduit. The caps are formed with holes for draining well water sprayed from the spray holes through the bottom cap to fall back down the well and for expelling contaminant-laden air through holes in the upper cap for venting at the top of the well.

According to preferred example construction arrangements, the spray conduit and check valve are spliced into the well pipe with first and second adaptors at the respective ends, with a first union joining the spray conduit and check valve and a second union joining the spray conduit and bottom adaptor. Furthermore, the spray holes are distributed at the top and bottom ends of the spray conduit and may, for example, be formed through the unions. The number of spray holes and the size of spray holes are selected for spraying, aerating and recirculating approximately 50% or less of the well water pumped through the well pipe.

Thus, the present invention generally contemplates providing spray holes in the well pipe at a location below the top of the well and above the average static water level in the well; spraying and aerating a fractional portion of the well water pumped through the well pipe and permitting the fractional portion of well water to fall back down the well; and checking the backflow of water in the well pipe from the building above the spray holes when pumping of water in the well pipe stops. The invention also contemplates deflecting the well water sprayed through the spray holes for further aeration in an aeration chamber. Generally, spraying and aerating a fractional portion of the well water pumped through the well pipe is limited to approximately 50% or less of the well water for preserving adequate pressure. In the preferred method the spray holes are distributed over a length of the well pipe, preferably at the top and bottom ends, for draining a length of the well pipe through the spray holes and leaving a pocket of air when pumping of well water through the well pipe ceases, and thereafter for expelling contaminant-laden air from the air pocket through spray holes when pumping of well water resumes.

Other objects, features and advantages of the invention are apparent in the following specification and accompanying drawings.

BRIEF DESCRIPTION OF THE DRAWINGS

FIG. 2 is a partially exploded view with the aerator conduit and aeration chamber components separated from the spray conduit, while

DESCRIPTION OF PREFERRED EXAMPLE EMBODIMENTS AND BEST MODE OF THE INVENTION

Figure 1:
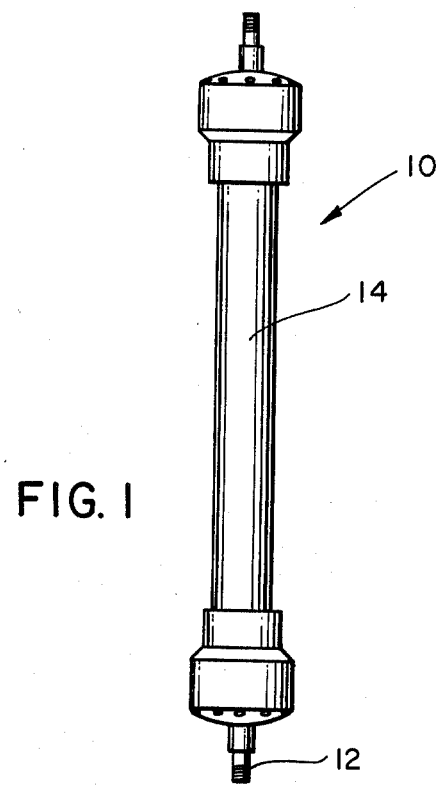
FIG. 1 is a side view of the spray conduit and aerator conduit aerator assembly ready for splicing into the well pipe of a well.
Figure 2:
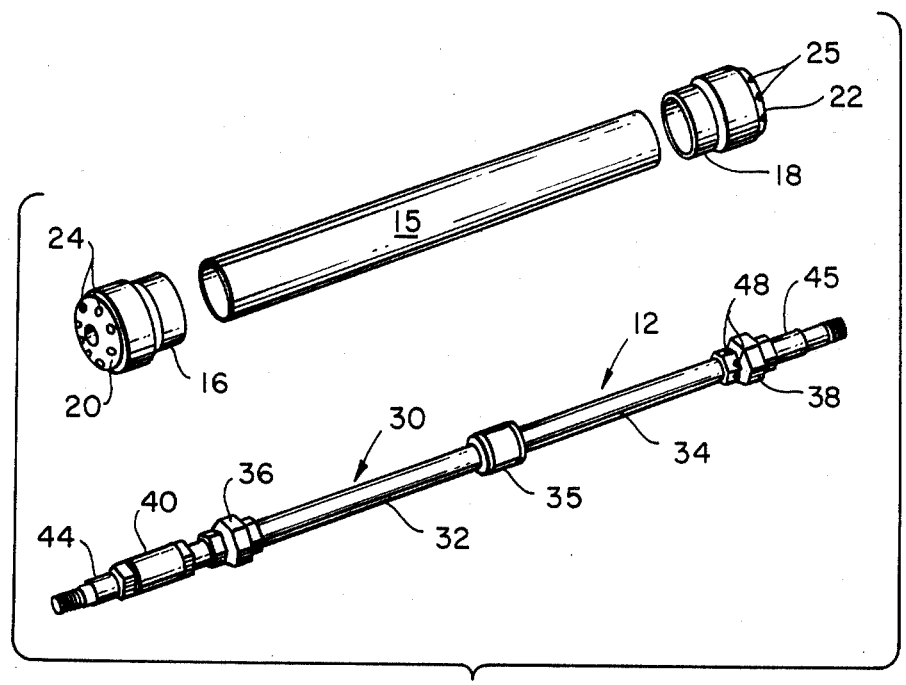
Figure 2A:
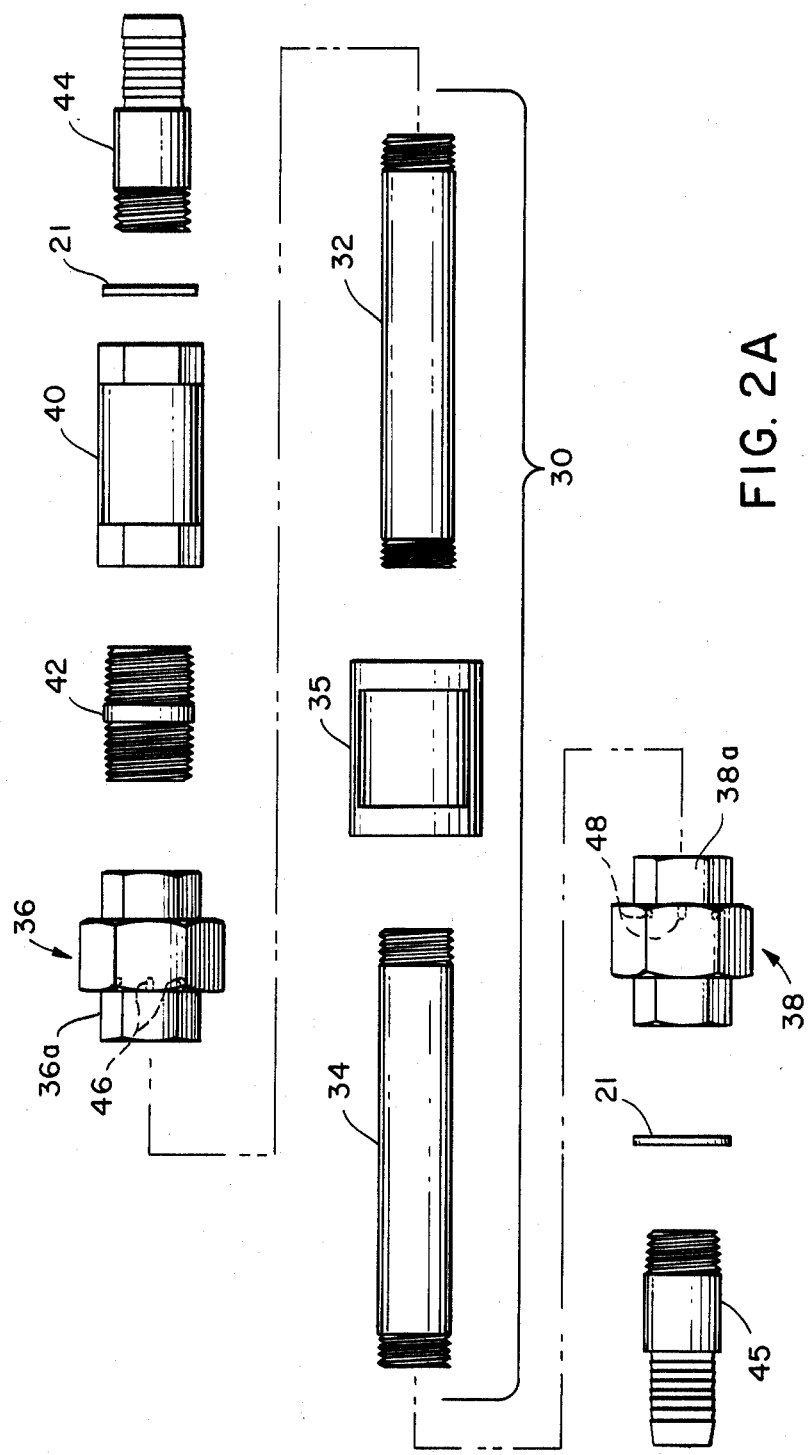
FIG. 2A is an exploded view of the aeration conduit.
Figure 3:
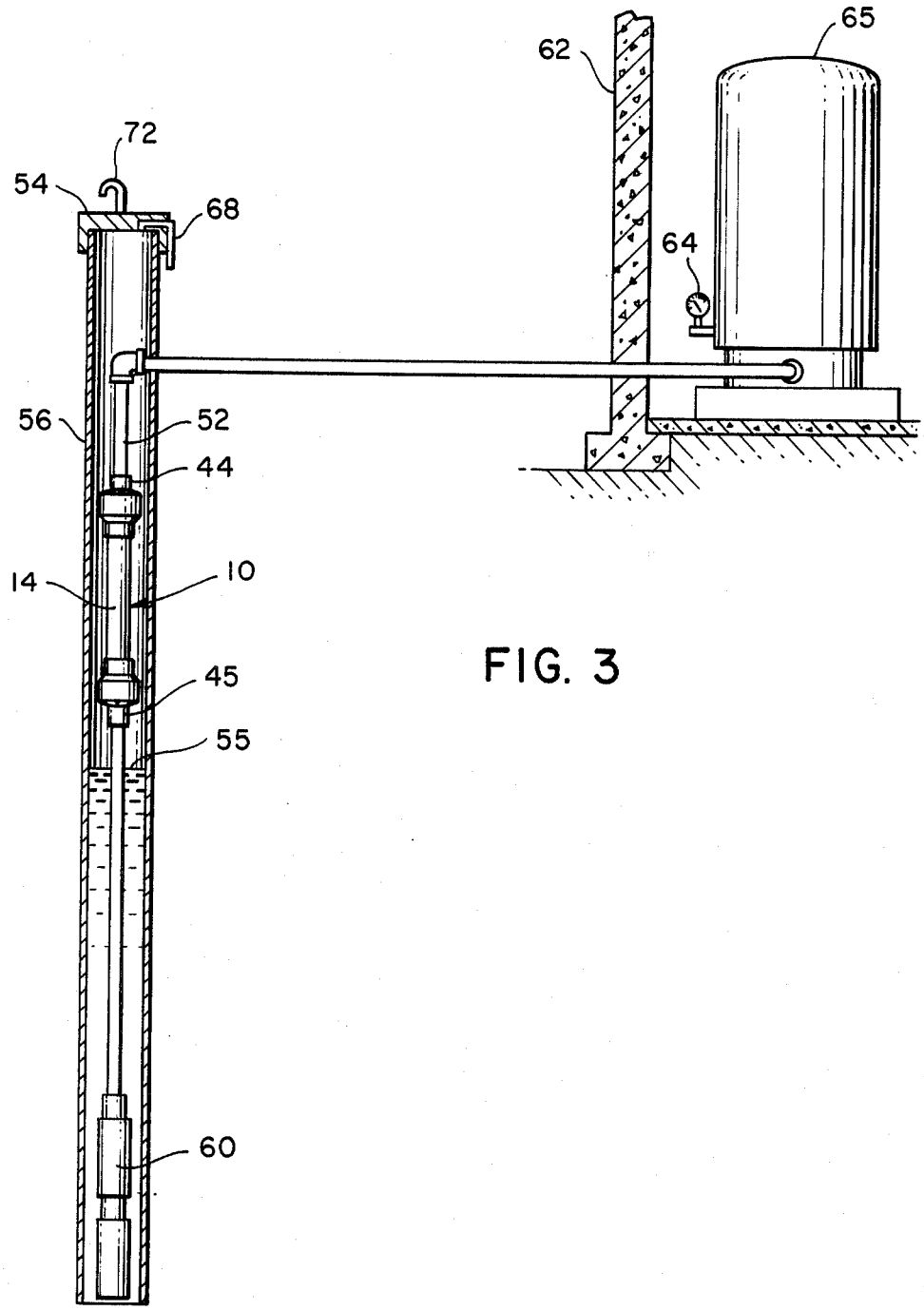
FIG. 3 is a diagrammatic systems view of the aerator installed in a well.

An in-line or in-well aerator for splicing or incorporating in the well pipe of a well is illustrated in FIGS. 1-3. The aerator 10 includes a length of spray conduit or pipe 12 and a comparable length of an aerator conduit assembly 14, which together define a spray chamber or aeration chamber. The outer coaxial aerator conduit may be provided, by a length of Schedule 40 PVC pipe 15, for example, 3 inches (7.6 cm) in diameter and 21½ inches (54.6 cm) long. PVC couplings 16 and 18, which may be for example 3-inch (7.6 cm) to 4-inch (10 cm) reducers, are coupled to each end of the pipe 15 and capped with 4-inch round top caps 20 and 22. Each of the caps is formed with a plurality of holes, for example, eight ¼-inch holes 24 and 25 drilled through the caps for the reasons hereafter described.

The heart of the in-well aerator according to the present invention is the spray conduit 12 formed by the sequence of plumbing elements shown in FIG. 2. The primary length of the spray conduit is provided by an elongate brass pipe element 30, for example, 1 inch (2.5 cm) inner diameter and 21 inches (53.3 cm) in length composed of two 10-inch brass pipes 32 and 34 joined by a 1-inch coupling 35. The central pipe element 30 can also be provided by a single length of pipe. Two-inch (5 cm) brass unions 36 and 38 are coupled at each end of the center length of pipe 30. The upper union 36 joins the conduit 30 to check valve 40 through nipple 42. The check valve 40 is in turn coupled to the upper adaptor 44. The lower union 38 is coupled to the lower adaptor 45. All couplings may be secured by Teflon sealing tape at the joints.

The spray holes for spray conduit 12 are provided in this preferred example embodiment through the respective upper and lower unions 36 and 38. The holes are drilled through the solid part 36a and 38a respectively of each union below or on the inboard side of the eight-sided turning piece on each of the upper and lower unions 36 and 38. One hole 1/16 inch (0.16 cm) in diameter is drilled through each flat of the solid part of the union below the turning piece providing eight holes each at the upper and lower ends of pipe length 30. The total of 16 holes in spray conduit 12, each 1/16 inch (0.16 cm) in diameter, preserves sufficient pressure in the well pipe for a water pump, for example in the range of ⅓ to ¾ horsepower, conventionally used in domestic water supplies to deliver water at adequate rate and pressure. The holes, not readily visible, are generally indicated diagrammatically at 46 and 48 respectively on the unions 36 and 38. The holes are selected for spraying, aerating and recycling 50% or less of the water flowing through the pipe, using well pumps of conventional horsepower, and preferably in the range of 30%–50% of the pumped water.

In operating the invention in a well as illustrated in FIG. 3, the aerator 10 is spliced into the well pipe 52, which is typically 1 inch (2.5 cm) inner diameter, 160 psi black plastic well pipe, with the adaptors 44 and 45 fitting into and joining the appropriately cut ends of the well pipe. The aerator conduit assembly 14 is previously installed over the spray conduit 12 as illustrated in FIG. 1 with PVC glue between all plastic parts of the aerator conduit assembly 14. "O" rings 21 over the adaptors provide sealing engagement with the caps 20 and 22 of the aerator conduit 14 and the adaptors 44 and 45 project through the caps 20 and 22, which are for example 1¼ inches (3.2 cm), for coupling to prepared ends of the well pipe.

The aerator 10 is preferably installed at a location below the top of cap 54 of the well, for example 8–10 feet (2.4–3 m) below the top of the well but above the static water level 55 in the well. The aerator 10 of the present invention may be spliced in the well pipe at a location inside the well casing 56, which is typically 6 inches (15 cm) in diameter and above the ledge for a drilled well.

In operation of the well water aeration system when the well pump, either a submersible pump 60 or a surface pump, is operating, a fractional portion of the water pumped through the well pipe is sprayed out the holes 46 and 48 at each end of the spray conduit 12 deflecting from the inner wall of the aerator conduit 14, thereby aerating and oxygenating the water. The spray creates turbulence in the aerator chamber defined between the spray conduit 12 and aerator conduit 14 for better aeration and venting of contaminant-laden air through the holes 24 in the upper cap 20 at the top of the aerator. Well water draining from the holes 25 in the bottom cap 22 in part runs down the side walls of the well with the result that ion buildup in the well water is reduced. If necessary or desirable, appropriate ion filters can be provided in the building, for example rechargeable ion filters available from a variety of sources.

When pumping ceases, the check valve 40 prevents backflow of water from the building 62 to the spray conduit 12 while the water in the spray conduit drains out through the holes 48 in the union 38 at the lower end of the spray conduit. Thus, an air space or air pocket of approximately 24 inches (61 cm) is created whenever the water is turned off. Some ventilation of volatile gases in water in the well pipe thus continues during periods of non-pumping. When the pressurestat or pressure gauge 64 in the water tank 65 calls for more water, thereby turning on the pump 60, contaminant-laden air in the air pocket or air space within the spray conduit 12 is expelled through the holes 46 in the upper union 36 at the top of the spray conduit so that contaminant-laden air cannot enter the home or other building through the water supply.

A number of variations and modifications are contemplated within the scope of the invention. For example, the spray conduit spliced into the well pipe below the top of the well but above the static water level in the well is generally located within the well casing. According to one alternative embodiment, the well casing 56 itself provides the aeration chamber, and recirculated well water sprayed through the holes of the spray conduit 12 deflects directly from the walls of the well casing 56 for greater aeration. The well casing is typically a steel or Schedule 40 PVC pipe 6 inches (15 cm) in diameter. Venting of contaminant-laden air from the well casing similarly takes place through the well cap 54, outlet or vent 68 for the pump electrical conduit, or an elbow 72 provided for aeration purposes in the well cap 54.

The spray conduit typically 1 inch (2.5 cm) in diameter is formed with spray holes spaced apart over a length of the spray conduit. In the preferred example embodiment described with reference to FIGS. 1 and 2, a ring of upper spray holes 36a and a ring of lower spray holes 38a are provided at either end of the spray conduit spaced apart approximately 2 feet (61 cm). According to an alternative example embodiment, spray holes are provided distributed over the length of the conduit but sufficiently few in number and small in diameter to preserve the necessary pressure in the well pipe from the well pump, which for an ordinary house or building is typically $\frac{1}{3}$, $\frac{1}{2}$, or $\frac{3}{4}$ horsepower. Sufficient holes must be provided, however, at the top and bottom for draining all the well water in the spray conduit section when the well pump is off and for expelling the air in the air pocket or length of the spray conduit when pumping resumes. It has been found that with the typical size domestic well pump a total of 16 holes, 1/16 inch (0.16 cm) in diameter, with 8 at each end, accommodates the functions of draining water and expelling air from the spray conduit while preserving adequate water pressure. A larger well pump, for example 1 horsepower or greater, may be able to circulate more water with more holes in the spray conduit while still maintaining adequate water pressure. Furthermore, the length of the spray conduit is selected so that it is adequate to provide some continuing aeration of water in the well pipe during periods of non-pumping.

The aerator may be operated with both one-line (submersible pump) and two-line (ground level pump) well systems. Furthermore, the pump may be operated cyclically for periodic aeration in the well or an additional pump can be added for cycling aeration operation when the water supply pump is not operating.

While the invention has been described with reference to particular example embodiments, it is intended to cover all modifications and equivalents within the scope of the following claims.

I claim:

1. A well water aerator for aeration removal of volatile contaminants from well water pumped through a well pipe of a well comprising:
   a well water recirculator spliced into the well pipe at a location below the top of the well but above the average static water level in the well, said recirculator comprising an elongate spray conduit and adaptor means at each end spliced into the well pipe, said spray conduit being formed with spray holes at least at the top and bottom ends of the spray conduit for spraying and aerating water pumped through the well pipe, said sprayed and aerated water falling back down the well, said spray holes being constructed and arranged in size and number to maintain adequate pressure for well water pumped through the well pipe while spraying, aerating and recirculating a fractional portion of the water.

2. The aerator of claim 1 further comprising check valve means joined to the upper end of the elongate spray conduit for blocking backflow of water into the elongate spray conduit when pumping of well water through the well pipe stops, the water in said elongate spray conduit emptying from the spray conduit by running out of the holes at the bottom end of the spray conduit leaving air in a length of air space, said air in the elongate spray conduit being expelled through the spray holes at the top end of the spray conduit when pumping of well water in the well pipe resumes.

3. The aerator of claim 2 further comprising first union means joining the elongate spray conduit to the check valve at the top end of the spray conduit and second union means joining the elongate spray conduit to the second adaptor means at the bottom end of the spray conduit.

4. The aerator of claim 3 wherein said spray holes at the upper and lower ends of the elongate spray conduit are formed through said first and second union means.

5. The aerator of claim 2 further comprising an elongate aeration conduit coaxially enclosing said elongate spray conduit so that well water sprayed through the spray holes at the ends of the spray conduit deflect from the walls of the aeration conduit for further aeration, said aeration and spray conduits defining an aeration chamber.

6. The aerator of claim 5 wherein said elongate aeration conduit comprises caps at each end formed with holes, said bottom cap being formed with holes for draining recirculating well water for falling back into the well, said upper cap being formed with holes for expelling contaminant-laden air to the top of the well for venting.

7. The aerator of claim 1 wherein the well comprises a well casing and said recirculator is spliced into the well pipe at a location within the well casing.

8. The aerator of claim 1 wherein the number and size of spray holes is selected for spraying, aerating and recirculating approximately 50% or less of the well water pumped through the well pipe.

9. The aerator of claim 8 wherein said spray holes comprise respectively at the top and bottom ends of the elongate spray conduit approximately eight 1/16-inch (1.6 mm) diameter holes.

10. A well water aeration system for removing volatile contaminants pumped through a well pipe of a well into a building comprising:
   an elongate spray conduit spliced into the well pipe at a location below ground but above the average static water level of the well, said spray conduit being formed with spray holes at respective top and bottom ends for spraying, aerating and recirculating a fractional portion of well water pumped through the well pipe, said fractional portion of water falling back down the well, said spray holes being selected in number and diameter to maintain adequate pressure for pumping well water through the well pipe;

check valve means positioned in the well pipe above the spray conduit to stop runback of water from the building into the elongate spray conduit when pumping of well water through the well pipe stops, whereby water in the spray conduit empties through the spray holes at the respective bottom end of the spray conduit leaving an air pocket in the spray conduit when pumping of well water through the well pipe stops, and whereby air in said air pocket is expelled through the respective spray holes at the top end of the spray conduit when pumping of well water in the well pipe resumes.

11. The well water aeration system of claim 10 further comprising an elongate aeration conduit of greater diameter than the elongate spray conduit and coaxially enclosing said spray conduit so that well water sprayed through the spray holes at the respective ends of the spray conduit deflects from the walls of the aeration conduit for greater aeration, said aeration conduit comprising first and second caps at the respective top and bottom ends of the aeration conduit, said second cap being formed with holes for draining well water sprayed through said spray holes for falling back in the well, said first cap being formed with aeration holes for expelling contaminant-laden air for venting at the top of the well.

12. The well water aeration system of claim 11 wherein the well comprises a well casing and wherein the spray conduit is located inside the well casing.

13. The well water aeration system of claim 10 wherein the number and size of the spray holes is selected for spraying, aerating and recirculating approximately 50% or less of well water pumped through the well pipe.

14. The well water aeration system of claim 10 wherein the spray holes are distributed at the top and bottom end of said spray conduit.

15. A method for aerating well water pumped through a well pipe of a well to a building comprising:
providing spray holes in the well pipe at a location below the top of the well and above the average static water level in the well;
spraying and aerating a fractional portion of the well water pumped through the well pipe from the well and permitting said fractional portion of well water to fall back down the well;
and checking the runback of water in the well pipe from the building above the spray holes when pumping of water in the well pipe stops.

16. The method of claim 15 further comprising a step of deflecting the well water sprayed through the spray holes for further aeration.

17. The method of claim 15 wherein the step of spraying and aerating a fractional portion of the well water pumped through the well pipe comprises spraying and aerating approximately 50% or less of the well water pumped through the well pipe.

18. The method of claim 15 further comprising a step of distributing said spray holes over a length of the well pipe thereby draining a length of the well pipe through the spray holes and leaving a pocket of air in the well pipe when pumping of well water through the well pipe ceases, and expelling the air in said air pocket through the spray holes when the pumping of well water in the well pipe resumes.

19. The method of claim 17 further comprising spraying and aerating approximately 30% to 50% of the well water pumped through the well.

20. The method of claim 15 wherein the step of providing spray holes in the well pipe comprises splicing a length of spray conduit in the well pipe below the top of the well and above the static water level in the well.

* * * * *